March 1, 1960
G. A. FRANCIS ET AL
2,926,843
NOMOGRAPHIC DEVICE FOR DETERMINING
THE LENGTH OF COILED MATERIAL
Filed June 12, 1957
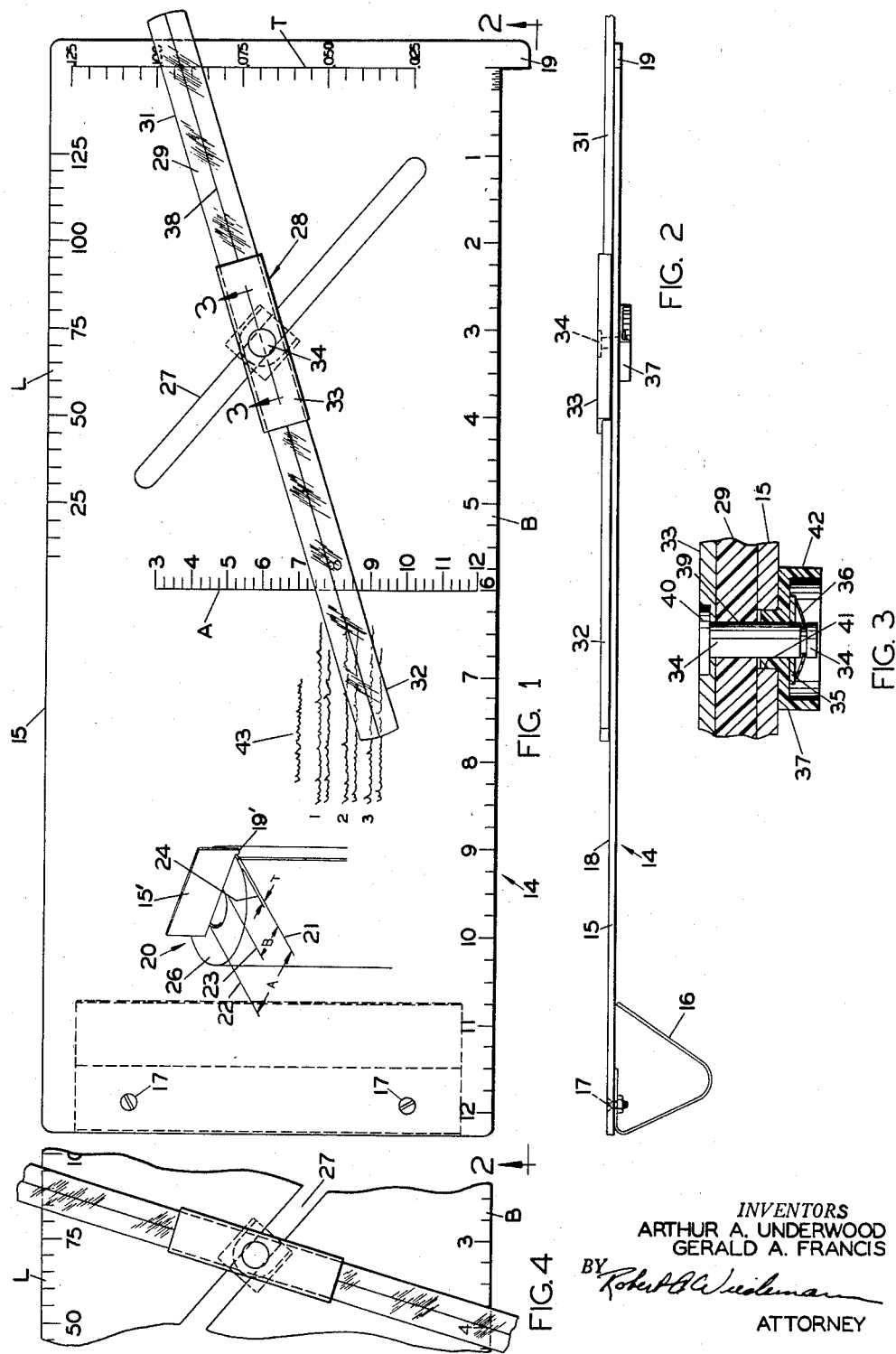
INVENTORS
ARTHUR A. UNDERWOOD
GERALD A. FRANCIS
BY Robert B. Wiedeman
ATTORNEY

United States Patent Office 2,926,843
Patented Mar. 1, 1960

2,926,843

NOMOGRAPHIC DEVICE FOR DETERMINING THE LENGTH OF COILED MATERIAL

Gerald A. Francis and Arthur A. Underwood, Columbus, Ohio, assignors, by mesne assignments, to Merle Hill, Norwalk, Ohio Application June 12, 1957, Serial No. 665,322

3 Claims. (Cl. 235—61)

This invention relates to measuring devices for determining the length of material in coils or rolls and more particularly to a measuring device for use in determining the linear measurement of linoleum and other rolled or coiled goods without unwinding the coiled or rolled goods and without counting the number of rolls or coils.

Many businesses, such as the floor covering business, maintain and stock rolled or coiled goods such as linoleum, carpeting and the like. It is desirable to know the exact length in a given roll or coil of material in order to determine whether or not there is sufficient of its kind to do a particular job. Likewise, it is necessary in such businesses to periodically take an inventory of the stock. Individual purchases of the goods or material in random lengths make the rolls or coils thereof remaining of various lengths. Such lengths are not capable of being accurately determined without unrolling and then measuring each individual coil or roll. In many instances when the lengths of such rolls must be determined much labor and time are consumed in unrolling and measuring such rolls to determine the remaining length. This is particularly true in the floor covering and linoleum business due to the resilient nature of the material and its weight and large widths. Therefore, there has been a long felt need in this particular industry for a method and device or apparatus for quickly, conveniently and accurately measuring the amount of material remaining in the roll at any particular time.

Some devices have heretofore been known in the art for determining the linear measurement of rolled or coiled material, many of which require the counting of the coils or rolls as a prerequisite to computation of the remaining length of the roll without unwinding same and still others have required many charts and tables in addition to taking various measurements of the roll in order to compute and determine the remaining length in the roll.

It is the principal object of this invention to provide a device of simple, compact construction which will readily and accurately compute the linear measurement of material or goods contained in a roll or coil without unwinding the material.

It is a further object of this invention to provide such a device that does not require the user to independently count and determine the number of rolls or coils of the material or goods to be measured.

It is still another object of this invention to provide a device for ultimately determining the linear measurement of rolls or coils of goods which contains not only the means for conveniently and accurately determining the linear measurement but which also provides, as an integral part of such device, the means for quickly making the initial measurements necessary to be made for such determination.

It is a further object to provide a device which is contained in one assembled unit and which may be operated by a person of no more than ordinary skill in mathematics and computation.

It is still a further purpose to provide a measuring device which is simple in construction and inexpensive to manufacture so as to be of reasonable cost relative to the time and labor saved through its use in inventory and stock control.

Other objects, features and advantages of the invention will appear from the detailed description of an illustrative form of the same which will be set forth below in conjunction with the accompanying drawings, in which:

Fig. 1 is a top or front view of the device and the position normally used by the operator;

Fig. 2 is a side view of the device taken from the position 2—2 of Fig. 1;

Fig. 3 is a section of the view taken along 3—3 of Fig. 1; and

Fig. 4 is a front view of a portion of the device with the indicator and handle at a different position.

Construction

Fig. 1 shows the measuring device or instrument of this invention as it normally appears to the user. The device, when constructed for use in measuring the length of linoleum in a coiled roll, is of a size to be easily held in one hand of the user. As it will appear from a lower scale B, which is shown in inches, by way of example, the length may be approximately 12 inches long.

The device 14 is in the general form of a planar body member 15. At one end a formed sheet member handle 16 may be fastened to body 15 by suitable means such as screws 17. Sheet member handle 16 is provided for convenience in handling the instrument while taking measurements and other operations. Scale indicia, A, B, T, and L are embodied on the upper planar surface 18 (Fig. 2) of the body member 15. Preferably the scales are disposed in a rectangular parallelogram with opposite scales in parallel position. In the rectangular arrangement, the maximum accuracy is usually obtained; however, other forms of parallelograms may be used.

One edge of the body member is substantially straight and incorporates the measuring scale B having at one end a projection 19. By way of example the measuring scale B is shown as being graduated in inches, being provided for convenience with 12 one-inch increments.

At one side the instrument 14 may be provided with a pictorial representation 20 of the end of a coiled roll 26 of material. The pictorial representation 20 graphically discloses the proper position for the use of the instrument 14.

It will be seen that in the proper use of the device the body 15 (designated 15' in the pictorial representation 20) of the instrument 14 is placed with the measuring scale edge B in contact with the end of, and on a radial plane passing through the center of, the roll 26. The projection 19 (designated 19' in the pictorial representation 20) contacts the outer peripheral edge of the roll 26, preferably adjacent to the end of the material.

With the instrument 14 in the proper position for use, the measuring scale B may be conveniently read to determine distances along the radial line of the roll upon which it is placed. The scale L, upon which are embodied representations indicating length determination for the material in the roll, is disposed opposite the measuring scale B. For convenience in the instrument 14 shown, the scale L is positioned along an edge, although this is not necessary as the body 15 could be wider and the upper edge further removed from the scale B.

Since the instrument 14 of the example is specifically intended for the measurement of linoleum in the lengths conventionally supplied to dealers in this trade or business, the graduations on the scale L are in units of one foot. Lengths of from 5 to 125 feet are represented as within the realm of measurement by means of the 12- inch length on scale B. Transverse to scales B and L and at one end of the instrument is the scale T having indications of .001 inch varying between limits of .025 inch to .125 inch, representing the conventional range of thickness of linoleum. Opposite the scale T is scale A having scale graduations of one-inch increments in the range from 3 inches to 12 inches.

The purpose and the significance of the scales A, B, and T will be seen in conjunction with the pictorial representation 20 for the use of the instrument 14. As shown by the dimension lines 21 and 22, the radial distance from the outer peripheral edge of the roll 26 to the far circumferential edge of the opening in the center of the roll is represented by the designation A. The distance A may be measured by means of scale B with the instrument 14 in the position shown on the pictorial representation 20. The reading obtained in the measurement is selected on the scale A on the face 18 of the body member 15.

In a like manner the radial distance from the outer peripheral edge of the roll 26 to the near circumferential edge of the opening in the center of the roll is designated B (between dimension lines 21 and 23) and may be read and selected on the scale B.

The thickness of the material in the roll is represented by the dimension lines 24 and 21 in the pictorial representation 20. The thickness of the material may be read on the scale B and the reading selected on the scale T on the face 18 of body member 15. Scale B, in inches may be further calibrated into fractions of an inch as small as thirty-secondths or sixty-fourths to facilitate accurate measurement of T—(thickness of material). However, the thickness (T) in all manufactured rolls of linoleum is standard and is indicated by the manufacturer on its container or wrapping. The standard thicknesses for standard linoleum stock are as follows: Heavy Linoleum, 0.125″; Standard Linoleum 0.093″; Corlon, 0.070″; and Budget Wall 0.045″. These standard thicknesses are well known in the trade and the user of the subject device has but to check the type of linoleum being used and T can be determined; usually without any measurement being taken. The T scale may also be marked accordingly to show the above mentioned standard thicknesses of the trade, if desired.

The position of the scales A, B, T, and L on the instrument 14 is that of a nomograph. The particular nomograph is proportional having only linear scale graduations on the scales A, B, T, and L. The position of the indicator assembly 28 on the diagonal slot 27 represents a logarithmic factor in the solution of problems to determine the length. However, since this position is not "read out" in the use of the instrument, but only serves as a pivot point in the method, the logarithmic scale does not appear. Because all scales are linear, the device 14 may be easily used by persons with only ordinary skill in mathematics. However, in the invention the scales of the nomograph are integrated and combined with the structure of a measuring tool. Thus, the usefulness of the graphical solution is made available in a specific field for the convenience of the workers in this field.

It is known that the length of a line or material coiled in a roll is determined by the following formula:

$$L = \frac{(R_1 + R_2)(R_1 - R_2)}{\frac{12T}{\pi}}$$

where $R_1$ equals the radius to the outer periphery of the roll; $R_2$ equals the radius to the inner circumference of the roll; T equals the thickness of the line or material; and when $R_1$, $R_2$ and T are in inches and it is desired to have L in feet the result is divided by 12, thereby converting inches to feet.

In a nomographic solution, each of the factors $(R_1 + R_2)$, $(R_1 - R_2)$, T, and L are represented on a scale. In the instrument of this invention, having the nomographic arrangement of scales previously described, the scale A represents factor $(R_1 + R_2)$, which is the sum of the radius to the outer periphery of the roll and the radius of the opening in the center of the roll. The scale B represents the factor $(R_1 - R_2)$, which is the difference between the radius to the outer periphery of the roll and the radius of the opening in the center of the roll. The scale T represents the factor $12/\pi$ in the formula. The constant $12/\pi$ (3.82) is applied in proportioning the T scale to the length to be used for that scale on the instrument. The factor L is represented by the scale L on the instrument.

A slot 27 is provided through body member 15. The center line of slot 27 is disposed on the diagonal of the rectangular parallelogram formed by scales A, T, B, and L. An indicator subassembly, designated generally as 28, is slidably and pivotably mounted in slot 27 and comprises an elongated pointer member 29 having oppositely projecting arms 31 and 32, an enclosing handle member 33, a pivot pin 34 with a washer 35 and an elastic fastener 36, and a slidable bearing member 37 (Fig. 3).

Pointer 29 may preferably be one continuous piece of transparent material, such as Plexiglas, having a line 38 on the bottom for registration with selected indicia of the scales B, L, A, and T.

The handle 33 may be a channel-shaped preferably opaque material such as aluminum of a length to cover the slot 27, and to provide enough space for conveniently sliding and rotating the indicator assembly 28. Handle 33 and pointer 29 are provided with a bore 39 and counterbore 40 for the reception of the pivot pin 34.

Pivot pin 34 passes through slot 27 and through bearing member 37 on the opposite side. A groove is provided near the end to receive elastic fastener 36 of conventional manufacture.

Bearing member 37 may be preferably formed with a slide portion 41 projecting into slot 27. Slide portion 41 is provided with parallel sides which are adapted to slide along the edges of slot 27. A shoulder 42 is formed integrally with bearing 37 to partially enclose the end of pivot pin 34 to prevent the possibility of the elastic fastener 36 being loosened by blows or knocks against the pivot pin 34. Bearing member 37 may preferably be manufactured of nylon which, in conjunction with aluminum of body member 15, has a coefficient of friction such that the indicator assembly 28 may be easily moved in slot 27 along its length by finger pressure; and yet will be held by friction in any position along the length of slot 27 when finger pressure for movement is released. The elastic fastener 36 urges the washer and bearing member 37 against the bottom of plate 15 while the shoulder of pivot pin 34 urges handle 33 and pointer 29 against the top of plate 15, thus resiliently clamping the indicator assembly 28 in position in slot 27.

The body member 15 may preferably be constructed of aluminum although molded plastics, fabricated plastics, or other materials could be used. The scales A, B, T, and L may preferably be etched or engraved into the surface of the body member. The pictorial representation 20, together with instructions 43 for the use of the instrument, such as indicated adjacent to the pictorial representation 20, may also be engraved or embodied on the body member 15 in a suitable manner.

Operation

In order to determine the length of material coiled in a roll without unrolling the coil, instrument 14 is placed on the end of a roll as shown in the pictorial representation 20 and as previously described. The dimension A is read from scale B and its representative position on A scale noted. The dimension T is known by reason of the standards of material in the case of linoleum floor covering. However, if the thickness is not known T may be measured and read on scale B, and its representative position noted on scale T. The user now slides and pivots the indicator assembly 28 in and over slot 27 until line 38 of arm 31 is over the proper selected representative position on the T scale and line 38 of arm 32 is over the proper representative position on the A scale. Because of the construction of the indicator assembly, it may be easily moved by manipulation of the handle 33 by hand, but will remain at the set position when hand pressure is removed.

In the next step, the operator reads the dimension B on the B scale and pivots the pointer 29 until line 38 on either arm 31 or 32 is over the proper representative position on the B scale, as shown in Fig. 4. With the pointer in this position, the length of the roll may be read from the L scale under line 38.

As an example, a length of a roll of standard gage linoleum having a 12-inch outer diameter and a 4-inch diameter hole is to be measured. From the scale B with the instrument in proper position, the A dimension is read as 8 inches. The T dimension of standard gage linoleum is known in the art as being 0.093 inch; or it could be read from the scale B with the instrument in proper position. The indicator assembly 28 is moved until pointer 29 registers with the indication of 8 on the A scale and the indication of .093 inch on the T scale. The arm 29 is now pivoted until one end registers with the B dimension, which has been read as 4 inches. The length of coil in the roll may be read as 90.6 feet (Fig. 4).

It has been found that an instrument constructed in the size herein illustrated may be used to measure a coiled length with an accuracy of within 2 percent.

It is apparent that, while the apparatus, structure, and method described and shown in detail, refer with particularity to a linoleum measuring instrument, it is apparent that an instrument could be constructed for the measurement of other materials coiled in a roll.

While an illustrative form of the invention has been disclosed in considerable detail, it will be understood that various changes may be made in the construction and arrangement of the various parts without departing from the general principles, scope and spirit of the invention.

What is claimed is:

1. Measuring apparatus for determining the coiled length of material in a roll comprising: a body member having a straight side edge and a planar surface and having four calibrated scales embodied on the planar surface, said four scales being arranged in the form of a parallelogram with adjacent pairs of scales intersecting at common origins at diagonally opposed corners of said parallelogram, one of said scales being disposed on said straight side edge of said body member for determining radial measurements of said coiled roll, said body member having an elongated slot through said planar surface on a diagonal passing through said origins; and a pivotable indicator assembly slidably mounted in said slot; said pivotable indicator assembly comprising a pointer member of transparent material in contact with planar surface and of a length sufficient to register with said scales in any adjusted position in said slot; a handle covering said pointer member for a portion of its length at a position intermediate the ends of said pointer member; a bearing member slidably mounted in said slot and contacting the surface of said body member opposed to said planar surface; a pivot pin mounted through said pointer member, handle, slot, and bearing member and having an enlarged end in contact with said handle; and an elastic fastener engaging said bearing member and the opposite end of said pivot pin, resiliently retaining said pivotable indicator assembly in assembled position.

2. Measuring apparatus for determining the coiled length of material in a roll comprising: a body member having a straight side edge and a planar surface with four calibrated scales embodied thereon, said scales being disposed as a parallelogram with adjacent pairs of scales intersecting at common origins at diagonally opposed corners of said parallelogram, and a slot in said body member and positioned on a diagonal passing through said origins; and a pivotable indicator member adjustably mounted in said slot and rendered operative under finger pressure for registering with said scales and indicating thereon the length of the material in said roll; said pivotable indicator assembly comprising, a pointer member of transparent material in contact with said planar surface and of a length sufficient to overlap all of said scales in any adjusted position in said slot when pivoted at all positions in said slot, a handle covering said pointer member for a portion of its length at a position intermediate its ends and having a pivot bore, a bearing member slidably mounted in said slot and contacting the surface of said body member at the side opposite said planar surface, a pivot pin mounted in said pivot bore, disposed through said slot and said bearing member, and an elastic fastener engaging said bearing member and the opposite end of said pivot pin, resiliently urging said bearing member and said pointer against said body and holding said indicator assembly at a set position until manually moved.

3. Measuring apparatus for determining the coiled length of material in a roll comprising: a platelike body member having a straight side edge and a planar surface with four scales having graduated divisional markings embodied on said planar surface, one of said scales being disclosed on the straight side of said body member for determining radial measurements of said coiled roll; said four scales being disposed as a rectangle with adjacent pairs of scales intersecting at common origins at diagonally opposite corners of said rectangle, and said body member having an elongated slot through said planar surface, said slot being located on the diagonal through said common origins of the rectangle formation of said scales; and a pivotable indicator assembly adjustably mounted in said slot; said indicator assembly being slidable and pivotable for registering with the graduation on said scales and indicating a predetermined relationship between the scales; said pivotable indicator assembly comprising, a pointer member of transparent material of a length sufficient to overlap all of said scales when pivoted at all positions in said slot, a handle covering said pointer member for a portion of its length at a position intermediate its ends and having a pivot bore, a bearing member slidably mounted in said slot and contacting said body at the side opposite said planar surface, a pivot pin mounted in said pivot bore, disposed through said slot and said bearing member, and an elastic fastener engaging said bearing member and said pivot pin, resiliently urging said bearing member and said pointer against said body and holding said indicator assembly at a set position until manually moved.

References Cited in the file of this patent

UNITED STATES PATENTS

| | | |
|---|---|---|
| 1,160,051 | Deitz | Nov. 9, 1915 |
| 1,279,829 | Bell | Sept. 24, 1918 |
| 1,404,019 | Gilson | Jan. 17, 1922 |
| 1,488,190 | Block | Mar. 25, 1924 |
| 1,667,812 | Miller | May 1, 1928 |
| 2,666,577 | Parker | Jan. 19, 1954 |

FOREIGN PATENTS

| | | |
|---|---|---|
| 911,601 | France | Mar. 18, 1946 |
| 452,655 | Great Britain | Aug. 26, 1936 |

OTHER REFERENCES

Graphical and Mechanical Computations, by John Lipka, published in 1918, by John Wiley and Sons, Inc., N.Y., pages 68–87 relied upon.